US012159308B2

(12) United States Patent
Raghavan et al.

(10) Patent No.: US 12,159,308 B2
(45) Date of Patent: Dec. 3, 2024

(54) SYSTEMS AND METHODS FOR PROVIDING PRODUCT DATA ON MOBILE USER INTERFACES

(71) Applicant: Shopify Inc., Ottawa (CA)

(72) Inventors: Kshetrajna Raghavan, Fremont, CA (US); Roni Gurvich, Ramat Gan (IL)

(73) Assignee: Shopify Inc., Ottawa (CA)

( * ) Notice: Subject to any disclaimer, the term of this patent is extended or adjusted under 35 U.S.C. 154(b) by 235 days.

(21) Appl. No.: 17/707,709

(22) Filed: Mar. 29, 2022

(65) Prior Publication Data

US 2023/0316387 A1  Oct. 5, 2023

(51) Int. Cl.
  *G06Q 30/00* (2023.01)
  *G06Q 30/0601* (2023.01)

(52) U.S. Cl.
  CPC ..... *G06Q 30/0643* (2013.01); *G06Q 30/0631* (2013.01)

(58) Field of Classification Search
  CPC ................ G06Q 30/0643; G06Q 30/0631
  See application file for complete search history.

(56) References Cited

U.S. PATENT DOCUMENTS

| | | | |
|---|---|---|---|
| 11,281,620 B2 | 3/2022 | Barve et al. | |
| 2015/0310528 A1 | 10/2015 | Sridhar et al. | |
| 2020/0142978 A1* | 5/2020 | Salokhe | G06F 18/24 |
| 2021/0287272 A1 | 9/2021 | Dumon et al. | |

FOREIGN PATENT DOCUMENTS

KR  20210137643 A  11/2021

OTHER PUBLICATIONS

Zhou, B.; Lapedriza, A.; Khosla, A.; Oliva, A.; Torralba, A. Places: A 10 million image database for scene recognition. IEEE Trans. Pattern Anal. Mach. Intell. 2017, 40, 1452-1464. (Year: 2017).*
International Search Report and Written Opinion for International Patent Application No. PCT/US2023/063645, mailed Jul. 4, 2023, 12 pages.

* cited by examiner

*Primary Examiner* — Anand Loharikar
(74) *Attorney, Agent, or Firm* — Withrow & Terranova, PLLC

(57) ABSTRACT

A computer-implemented is disclosed. The method includes: receiving, via a client device, a product search query; identifying a first product attribute based on query terms associated with the product search query; obtaining at least one search result matching the product search query; obtaining a set of product images associated with the at least one search result; for each of the product images, determining a respective level of confidence based on an estimation as to whether the product image is associated with the first product attribute; ranking the product images based on the levels of confidence; selecting at least a subset of the product images based on the ranking; and providing, via the client device, an indication of the at least one search result and the associated subset of product images.

14 Claims, 11 Drawing Sheets

E-Commerce Platform

Q Search

⌂ Home
🏷 Orders
◇ Products
⊙ Customers
⏹ Reports
🏷 Discounts
▦ Apps

SALES CHANNELS
⦿ Online Store
◇ Mobile App
View all channels

⚙ Settings

JG John's Apparel
Jonny B. Good

All channels ⌄    Today ⌄

Good afternoon, Jonny B..
Here's what's happening with your store today.

Today's total sales    Today's visits
$98.00              1

● Update your Platform Payments tax details
We require additional information to verify your identity.
[Update tax details]

● Advanced Cash on Delivery has been deactivated for your store
[See why]

TOTAL SALES
$98.00

$125
$75
$25
12am    4pm   8pm   11pm

Jun 1
2 orders

TOTAL SALES BY CHANNEL    View dashboard

Online Store                   Jun 1
$0.00                      0 orders

Mobile app
$0.00                      0 orders

Shopify POS (126 York St.)
$0.00                      0 orders

FIG. 11

SYSTEMS AND METHODS FOR PROVIDING PRODUCT DATA ON MOBILE USER INTERFACES

FIELD

The present disclosure relates to user interfaces and, in particular, to systems and methods for providing product data via user interfaces on mobile computing devices.

BACKGROUND

Merchants can offer their products to customers through various different e-commerce channels, such as websites, dedicated retail applications, social media platforms, and the like. Customers may access these channels using mobile devices. The limited display space on mobile devices makes user interface design and management a crucial factor for a customer's e-commerce experience. In particular, it is generally desired to optimize use of available display space on mobile devices to facilitate effective presentation of product data to customers.

BRIEF DESCRIPTION OF THE DRAWINGS

Embodiments will be described, by way of example only, with reference to the accompanying figures wherein:

FIG. 11 is an example of a home page of an administrator, in accordance with an example embodiment.

DETAILED DESCRIPTION OF EMBODIMENTS

Figure 1:
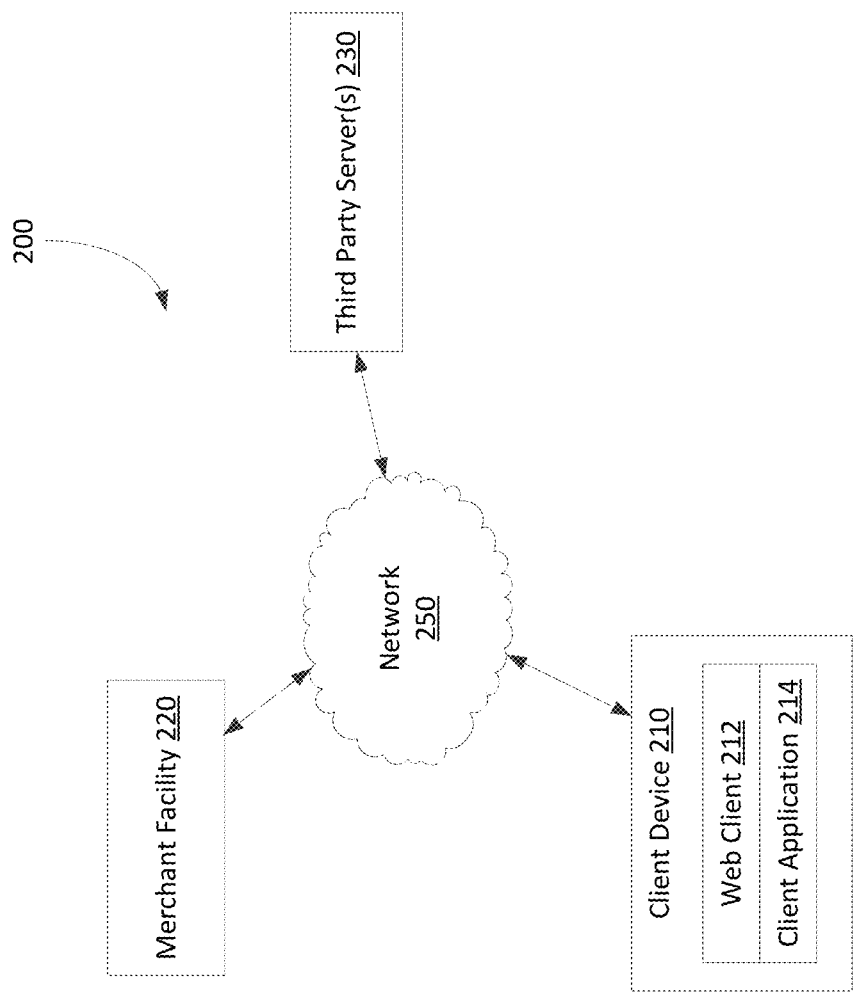
FIG. 1 illustrates an example system for processing requests to access merchant product data, including an implementation of a merchant facility.

In an aspect, the present application discloses a computer-implemented method. The method includes: receiving, via a client device, a product search query; identifying a first product attribute based on query terms associated with the product search query; obtaining at least one search result matching the product search query; obtaining a set of product images associated with the at least one search result; for each of the product images, determining a respective level of confidence based on an estimation as to whether the product image is associated with the first product attribute; determining a ranking of the product images based on the levels of confidence; selecting at least a subset of the product images based on the ranking; and providing, via the client device, an indication of the at least one search result and the associated subset of product images.

Conveniently, in this way, a subset of product images of a product may be selected for use in providing a user interface for an e-commerce channel that is optimized for mobile devices.

In some implementations, identifying the first product attribute may include: determining one or more queried attributes based on the query terms associated with the product search query; and identifying the first product attribute based on comparing the queried attributes and a plurality of defined product attributes.

In some implementations, the subset of the product images may include a predefined number of the highest ranked product images of the ranking.

In some implementations, determining the ranking of the product images may include determining confidence scores for each product image that is associated with the search result and the ranking correlates to an ordering of the product images based on confidence scores.

In some implementations, the method may further include, prior to receiving the product search query: obtaining product images associated with a plurality of products; and tagging the product images with product attribute data.

In some implementations, the tagging of product images with product attribute data may be performed using a machine learning model that is trained using a defined set of product attributes.

In some implementations, the method may further include generating, for each of the plurality of products, a data object indicating the set of product attributes and a ranking of images of the product associated with each of those product attributes.

In some implementations, determining the ranking of the product images may include, for a customer associated with the client device, obtaining image interaction data for the customer, the image interaction data indicating previous interactions by the customer with product images associated with one or more products, and the ranking may be determined based on the confidence scores and the image interaction data for the product images.

In some implementations, the image interaction data may indicate previous interactions with product images associated with one or both of previously viewed products and previously purchased products.

In another aspect, the present application discloses a computing system. The computing system includes a processor and a memory storing computer-executable instructions that, when executed, configure the processor to: receive, via a client device, a product search query; identify a first product attribute based on query terms associated with the product search query; obtain at least one search result matching the product search query; obtain a set of product images associated with the at least one search result; for each of the product images, determine a respective level of confidence based on an estimation as to whether the product image is associated with the first product attribute; determine a ranking of the product images based on the levels of confidence; select at least a subset of the product images based on the ranking; and provide, via the client device, an indication of the at least one search result and the associated subset of product images.

In another aspect, the present application discloses a non-transitory, computer-readable medium storing computer-executable instructions that, when executed by a processor, configure the processor to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "product data" refers generally to data associated with products that are offered for sale on an e-commerce platform. The product data for a product (e.g., goods, services) may include, without limitation, product specification, product category, manufacturer information, pricing details, stock availability, inventory location(s), expected delivery time, shipping rates, and tax and tariff information. The product data may be represented in various formats, such as text, video, image, and audio. While some product data may include static information (e.g., manufacturer name, product dimensions, etc.), other product data may be modified by a merchant on the e-commerce platform. For example, the offer price of a product may be varied by the merchant at any time. In particular, the merchant may set the product's offer price to a specific value and update said offer price as desired. Once an order is placed for the product at a certain price by a customer, the merchant commits to pricing; that is, the product price may not be changed for the placed order. Product data that a merchant may control (e.g., change, update, etc.) will be referred to as variable product data. More specifically, variable product data refers to product data that may be changed automatically or at the discretion of the merchant offering the product.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and any associated payment requests, via an e-commerce platform, and the e-commerce platform may be equipped with transaction/payment processing components or delegate such processing activities to one or more third-party services. An e-commerce platform may be extendible by connecting one or more additional sales channels representing platforms where products can be sold. In particular, the sales channels may themselves be e-commerce platforms, such as Facebook Shops™, Amazon™, etc.

Techniques for Presenting Product Data on Mobile User Interfaces

The ubiquity of mobile devices underscores the importance of mobile user interface design and management. It is generally desired to optimize use of limited display space on mobile devices in order to conveniently and effectively present information to device users. This principle also applies to the e-commerce context. Customers use mobile devices to access various e-commerce channels (e.g., websites, retail applications, etc.). A user interface for an e-commerce channel that is optimized for mobile devices may facilitate effective presentation of product data to customers and thereby make for an enhanced overall e-commerce experience.

Typically, a customer's first interaction with product data of a merchant's products is through a product list. For example, a product listing page of a website (or mobile app, etc.) may present a list of all products in a merchant's catalogue, a filtered list of products of a particular product category, or a set of search results for a customer's product search. The information provided in such product lists is often crucial for motivating further user interface interaction (e.g., product page click-through) and ultimately converting to sales. Furthermore, by controlling elements of user interfaces for optimally displaying product lists, a customer may be able to economize on user interface operations (e.g., scrolling, expanding content, etc.) to access product data. As such, a user interface that enables effective presentation of product data can provide substantial benefits to both e-commerce merchants and customers.

A product list item typically includes information about an associated product, such as price, availability, review ratings, and the like. For example, a product list item in a list of search results for a product search may include information about a product having attributes that match the search parameters. The product list item may be accompanied by one or more preview images of the product. A preview image may, for example, be selected from a set of product images that are uploaded by the merchant of the product. On an e-commerce channel, the default behaviour of a product list function for selecting a main preview image of a product list item may be defined by an arbitrary rule (e.g., a rule designating the first of the uploaded images as the main preview image). A preview image thus selected may not be a most relevant image of the product for a given customer and/or product search and, as a consequence, represent a non-optimal presentation of product data on the user interface.

The present application describes solutions for addressing some of the aforementioned technical limitations associated with conventional e-commerce user interfaces. Specifically, techniques are disclosed for selecting a primary image (e.g., a main preview image) of a product for presenting in association with a product list item on a mobile user interface. The disclosed techniques use rankings of product images that are based on confidence levels representing whether the respective images are associated with various attributes of a product. An image that is suitably selected based on a relevant ranking of product images may be designated as the primary image for the product list item.

In an aspect, a computing system for presenting product search results on a mobile user interface is disclosed. The computing system employs a machine learning model that is trained using (1) a limited set of product attributes that are designated as being important ("key attributes") for one or more products and/or product categories, and (2) images of products from sample catalogues that are tagged according to said key attributes. For an e-commerce platform, images of products in the merchants' catalogues are tagged, using the trained machine learning model, using relevant ones of the key attributes.

Once the product images are tagged by the machine learning model, the images are classified according to key attributes that are detected in the images. That is, for each of the key attributes, the computing system identifies a set of the product images that are associated with the key attribute. The images corresponding to each key attribute are then ranked based on an estimation of the images' relevance to the key attribute. In particular, the ranking of the images is determined based on confidence levels representing relevance of the respective images to each of the key attributes.

The presentation of preview images for product search results can then be based on the ranking of the product images. When a product search query is received by the computing system, one or more key attributes may be identified based on the query. For example, key attributes that are related to the query terms of the query may be identified. For each of the product search results (i.e., exact or close product matches), the product images showing the selected key attributes may be ranked. One or more preview images can then be provided for the product search result by suitably selecting a subset of the product images in accordance with the ranking. In this way, for an e-commerce merchant, the product image(s) that are most likely to lead to sales conversion for a given product search result and/or customer can be identified and presented with product data via the mobile user interface.

In addition to this "attribute-confidence" analysis of product images, the computing system may use other factors to determine a ranking of product images in order to select a suitable representative image for each of the product search results. In at least some embodiments, image quality metrics may be used to determine a ranking of images. The image quality measures may be determined, for example, by a second, different machine learning model which outputs: a score representing whether the product is in focus; a classification of the perspective showing the product (e.g., perspective view, front view, etc.); whether the images feature a person wearing the product; color, brightness, contrast, and hue of the images; the proportion of the image taken up by the product; and whether the images show the product in the context of other products.

The computing system may additionally use a customer's profile data in determining a ranking of product images for selecting representative images of product search results. In at least some embodiments, the computing system may obtain a customer's image interaction data for images associated with products previously viewed or purchased by the customer. The image interaction data may be collected by the computing system itself. The image interaction data for an image may indicate, for example: amount of time spent viewing the image; image manipulation events (e.g., zoom, pan, rotate, etc.); and purchase events recorded within a defined length of time after viewing the image. Based on the customer's image interaction data, the computing system may identify commonalities between images of previously viewed or purchased products that the customer had a high level of engagement with.

The computing system may determine a ranking of product images for presenting with product search results based on a combination of one or more of attribute-confidence analysis, customer profile data (e.g., image interaction data), and image quality metrics. For example, the primary signal for determining a ranking of product images may be the attribute-confidence analysis, and the other signals may be used for tie-breaks among images having statistically the same confidence levels.

In some embodiments, the disclosed techniques for determining ranking of product images may be employed in other contexts, such as navigation in a graphical user interface or filtering of product images. For example, a GUI of an application for accessing product information of various products may include a faceted visual search navigation menu. The menu items of the navigation menu may represent distinct attributes (e.g., sleeve length, collar type, color, etc.) of a product. Upon receiving user input of selection of one or more attributes using the navigation menu, the product image(s) for presenting via the GUI may be selected based on relevant rankings of product images associated with the one or more attributes.

Reference is first made to FIG. 1, which illustrates, in block diagram form, an example system 200 for processing requests to access merchant product data. As shown in FIG. 1, the system 200 may include a client device 210, a merchant facility 220, third-party server(s) 230, and a network 250 connecting one or more of the components of system 200.

As illustrated, the client device 210 and the merchant facility 220 can communicate via the network 250. In at least some embodiments, the client device 210 may be a computing device. The client device 210 may take a variety of forms including, for example, a mobile communication device such as a smartphone, a tablet computer, a wearable computer (such as a head-mounted display or smartwatch), a laptop or desktop computer, or a computing device of another type. The client device 210 includes, at least, a web client 212 (e.g., a web browser application) and a client application 214. The client application 214 may be, for example, a dedicated retail application associated with an e-commerce platform and/or a merchant. In particular, the client application 214 may be used for accessing an e-commerce platform and/or a merchant's online store on the client device 210.

The merchant facility 220 represents a computing system associated with a specific merchant. In some embodiments, the merchant facility 220 may be a backend server associated with a merchant's online store. For example, the merchant facility 220 may be an application server associated with an online point-of-sale (e.g., website, mobile application, etc.) that is operated by a merchant. The online point-of-sale may be accessed by a customer via a user interface, provided by the application server, on the client device 210. Additionally, or alternatively, the merchant facility 220 may be integrated with an e-commerce platform. In particular, the merchant facility 220 may be associated with one or more storefronts of a merchant that are supported by an e-commerce platform. A merchant's online e-commerce service offerings may be provided via the merchant facility 220.

The network 250 is a computer network. In some embodiments, the network 250 may be an internetwork such as may be formed of one or more interconnected computer networks. For example, the network 250 may be or may include an Ethernet network, an asynchronous transfer mode (ATM) network, a wireless network, or the like.

Figure 2:
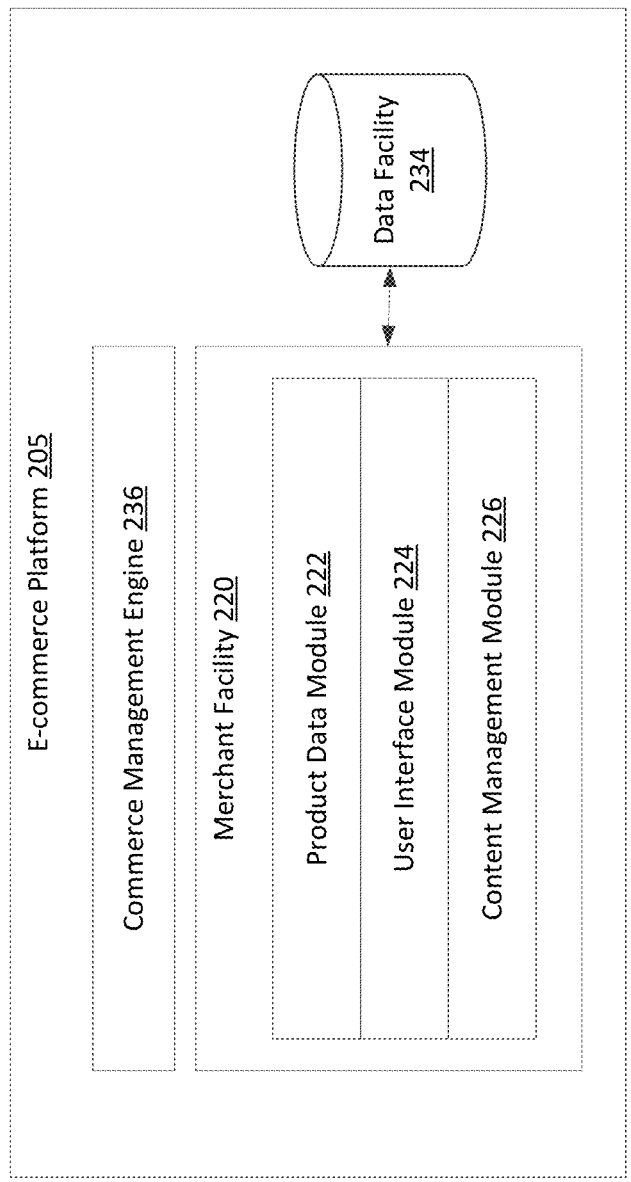
FIG. 2 is a block diagram of an e-commerce platform that is configured for implementing example embodiments of the merchant facility of FIG. 1.

Reference is made to FIG. 2 which illustrates an example embodiment of an e-commerce platform 205. The e-commerce platform 205 includes a commerce management engine 236, a product data module 222, a user interface module 224, a content management module 226, and a data facility 234. The functionalities described herein may be used in commerce to provide improved customer experiences. In particular, the e-commerce platform 205 may implement functionalities of one or more of the illustrated modules (or engines, applications, etc.), examples of which are described herein. Furthermore, it will be understood that functionalities of one or more of the illustrated modules may be implemented by different components that are within or external to the e-commerce platform 205.

The commerce management engine 236 may be configured to handle various operations in connection with e-commerce accounts that are associated with the e-commerce platform 205. For example, the commerce management engine 236 may be configured to retrieve e-commerce account information for various entities (e.g., merchants, customers, etc.) and historical account data, such as transaction events data, browsing history data, and the like, for selected e-commerce accounts.

As illustrated in FIG. 2, the merchant facility 220 may include a product data module 222, a user interface module 224, and a content management module 226. The product data module 222 may be configured to obtain, store, and manage product data for products of one or more merchants. In at least some embodiments, the product data module 222 may receive and process requests to access product data associated with merchants that are supported on the e-commerce platform 205. For example, the product data module 222 may handle product search queries that are directed to the merchant facility 220 via, for example, a client device of a customer. Upon receiving a product search query, the product data module 222 may perform a series of operations for querying one or more product databases, retrieving query results, and formatting the search results for providing a response to the product search query.

The user interface module 224 manages user interfaces associated with e-commerce channels through which a merchant offers their products. The user interface module 224 may generate, control, and update user interfaces such as, for example, a web user interface, a mobile application graphical user interface (GUI), and the like, by which customers can access a merchant's online storefronts.

The content management module 226 generates content for populating user interfaces associated with a merchant's e-commerce offerings. In particular, the content management module 226 may generate display data for presenting via one or more user interfaces, which are provided by the user interface module 224. By way of example, the content management module 226 may communicate with the product data module 222 to obtain product data (e.g., search results of a product search) of one or more merchants' products, generate display data graphically representing the merchants' product data, and provide the generated display data to the user interface module 224.

The data facility 234 may store data collected by the e-commerce platform 205 based on the interaction of merchants and customers with the e-commerce platform 205. For example, merchants provide data through their online sales activity. Examples of merchant data for a merchant include, without limitation, merchant identifying information, product data of products offered for sale, online store settings, geographical regions of sales activity, historical sales data, and inventory locations. Customer data, or data which is based on the interaction of customers and prospective purchasers with the e-commerce platform 205, may also be collected and stored in the data facility 234. Such customer data may be obtained on the basis of inputs received via customer devices associated with the customers and/or prospective purchasers. By way of example, historical transaction events data including details of purchase transaction events by customers on the e-commerce platform 205 may be recorded and such transaction events data may be considered customer data. Such transaction events data may indicate product identifiers, date/time of purchase, final sale price, purchaser information (including geographical region of customer), and payment method details, among others. Other data vis-à-vis the use of e-commerce platform 205 by merchants and customers (or prospective purchasers) may be collected and stored in the data facility 234.

The data facility 234 may store profile data for customers of the e-commerce platform 205. For example, the data facility 234 may store account information, order history, browsing history, and the like, for each customer having an account associated with the e-commerce platform 205. In particular, the stored profile data for a customer may include user interface interaction data for the customer. A customer's user interface interaction data represents historical user engagement data in connection with one or more user interfaces associated with e-commerce channels and may include, without limitation, user interface usage data (e.g., device used, number of hours, etc.), link click-through data, content (e.g., video, image, etc.) interaction data, and the like.

Figure 3:
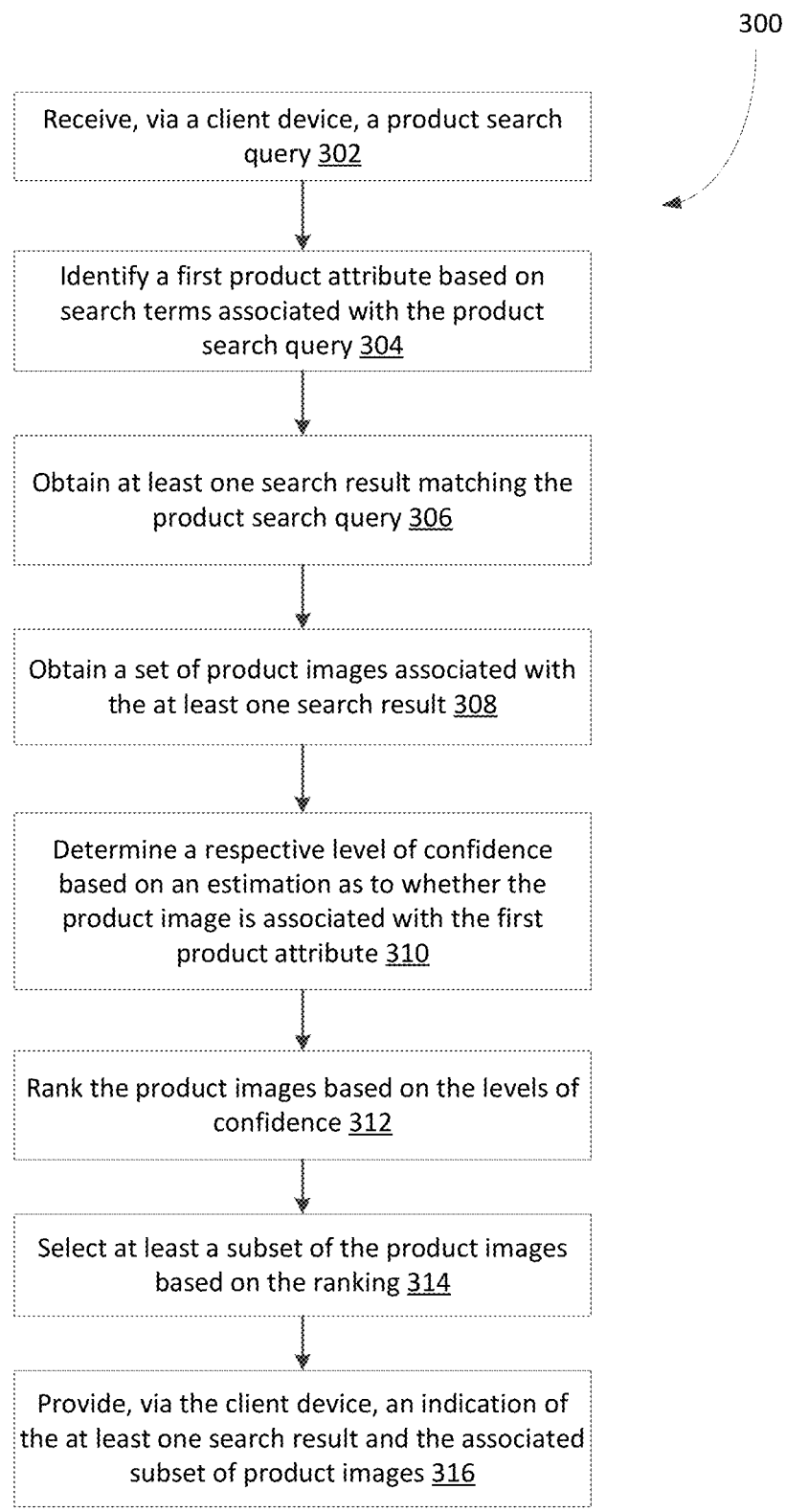
FIG. 3 shows, in flowchart form, an example method for presenting product data via a user interface on a mobile computing device.

Reference is now made to FIG. 3, which shows, in flowchart form, an example method 300 for presenting product data via a user interface on a computing device. The method 300 may be performed by a computing system associated with one or more merchant facilities, such as the e-commerce platform 205 of FIG. 2. For example, a merchant facility (such as the merchant facility 220) of an e-commerce platform, or components thereof (such as the product data module 222), may perform the operations of method 300 when processing requests to provide product data for products of merchants that are supported on the e-commerce platform. In particular, the method 300 may be implemented in processing product search queries that are initiated via a graphical user interface on a mobile computing device.

A product search query may be directed to a computing system associated with a merchant facility and/or an e-commerce platform. Specifically, a computing system may receive, via a client device, a product search query, in operation 302. The product search query may be generated based on user input for defining the parameters, such as query phrase or keyword combination, maximum number of results, merchant identifiers, etc., of the product search. In at least some embodiments, the product search may be initiated via a user interface associated with an e-commerce channel, such as a web user interface or a GUI of a mobile application. For example, a customer using a dedicated mobile application associated with a merchant's online store may initiate a product search by inputting definitions of search parameters directly via the GUI of the mobile application.

In operation 304, the computing system identifies at least one first product attribute based on query terms that are associated with the product search query. Specifically, the computing system determines a "key" product attribute from the product search query. The first product attribute, or key attribute, represents an attribute that is significant for the product search and/or the user requesting the product search. By way of example, a user may input a product search query that includes multiple words or phrases, e.g., "knee-high leather boots". The product search query may be parsed into constituent parts to identify a candidate term for a product (e.g., boots) and one or more candidate terms which may be attributes (e.g., "knee-high" and "leather") of the product. All or a subset of the identified candidate terms for product attributes, or "queried attributes", may then be designated as the first attributes, in operation 304.

In some embodiments, the at least one first product attribute may be selected from a predefined set of key attributes. In particular, the computing system may determine one or more queried attributes based on parsing the product search query and identify the at least one first product attribute by comparing the queried attributes and a set of defined key attributes relating to the product search query. A key attribute that matches at least one of the queried attributes may then be set as a first product attribute. For example, the computing system may identify at least one key attribute that best matches one or more of the queried attributes and designate such key attribute as a first product attribute.

The set of predefined key attributes may be stored or obtained by the computing system and may include, for example, a defined list of attributes that are designated as being common, popular, or most relevant for a particular product or product category. Upon receiving the product search query, the computing system may obtain a list of common/popular/relevant attributes for the product(s) and/or product category being searched (e.g., "boots" in the above example search query). The queried attributes that match one or more of the key attributes in the obtained list may be designated as a first product attribute. The query terms associated with the product search query may thus be used for identifying a relevant set of predefined key attributes and for determining queried attributes to compare with the key attributes in identifying the at least one first product attribute.

The query terms of the product search query may match multiple key attributes for a product or product category. In such cases, the computing system may be configured to identify at least one most relevant of the key attributes and set that attribute as a first product attribute. For example, in some embodiments, each key attribute (i.e., attributes in a list of most common or popular attributes for a searched product) may be associated with a numerical average confidence score representing an average of the confidence levels associated with the product images that are relevant to the key attribute. A key attribute that is associated with the highest average confidence score may, for example, be designated as a first product attribute.

In operation 306, the computing system obtains at least one search result matching the product search query. For example, the computing system may itself perform, or cause to be performed, a database query of a product database to identify those products matching the query terms of the product search query. The database query may return a plurality of products that have associated product attributes matching the query terms. Each product may, for example, be tagged or associated with product attribute data, and the product attribute information (e.g., metadata, tags, etc.) may be compared against the query terms in order to identify those of the products in the product database that are relevant to the product search query.

The computing system then obtains a set of product images associated with the at least one search result, in operation 308. In particular, for each of the product search results, the computing system obtains one or more product images. The product images may, for example, be retrieved from a product database storing product data provided by merchants offering the products for sale. For example, the product images may include images uploaded by a merchant to a product database that is maintained by and/or accessible to the computing system.

For each of the product images, the computing system determines a respective level of confidence based on an estimation as to whether the product image is associated with the first product attribute, in operation 310. In particular, the computing system may assign, for each product image, a numerical indicator (e.g., a confidence score) representing a degree of confidence that the product featured in the product image is associated with the first product attribute. The numerical indicator for a product image may represent a degree of the confidence that the featured product has or is characterized by the first product attribute. For example, a higher confidence score may represent a higher level of confidence or certainty that the associated product image has or is characterized by the first product attribute. As will be explained in greater detail below with reference to FIG. 4, the assignment of confidence levels to product images may be performed using a machine learning model with a training data set comprising product images from a sample catalogue and a predefined set of key product attributes.

In operation 312, the computing system ranks the product images based on the respective levels of confidence associated with the product images. For example, each product image may have an associated confidence score with respect to the first product attribute and the product images may be ranked in accordance with an ordering based on confidence scores, i.e., a product image having a higher confidence score is ranked higher in the ranking.

Once the product images have been ranked, the computing system selects at least a subset of the product images based on the ranking, in operation 314. In at least some embodiments, the computing system may select a predefined number of the highest ranked product images of the ranking. By way of example, the computing system may select the highest ranked product image, i.e., the product image that is associated with the highest confidence score. The number of product images that are selected in operation 314 may depend on a user interface that is used for presenting the product search results. For example, the selected subset of product images may be included in a set of preview images associated with a product search result. The settings for the user interface may indicate the number of preview images that are to be used for each product listing, and said number may determine how many of the ranked product images are selected for inclusion in the subset.

In operation 316, the computing system provides, via the client device, an indication of the at least one search result and the associated subset of product images. That is, in response to a product search initiated via a client device, the computing system provides a query response comprising, at least, an indication of product images which may be presented in association with the one or more search results for the product search. In particular, for each search result (i.e., a product matching the product search query), the computing system may provide to the client device a subset of images of the product containing those images that are determined to be most relevant to the first product attribute identified based on the product search query.

Figure 4:
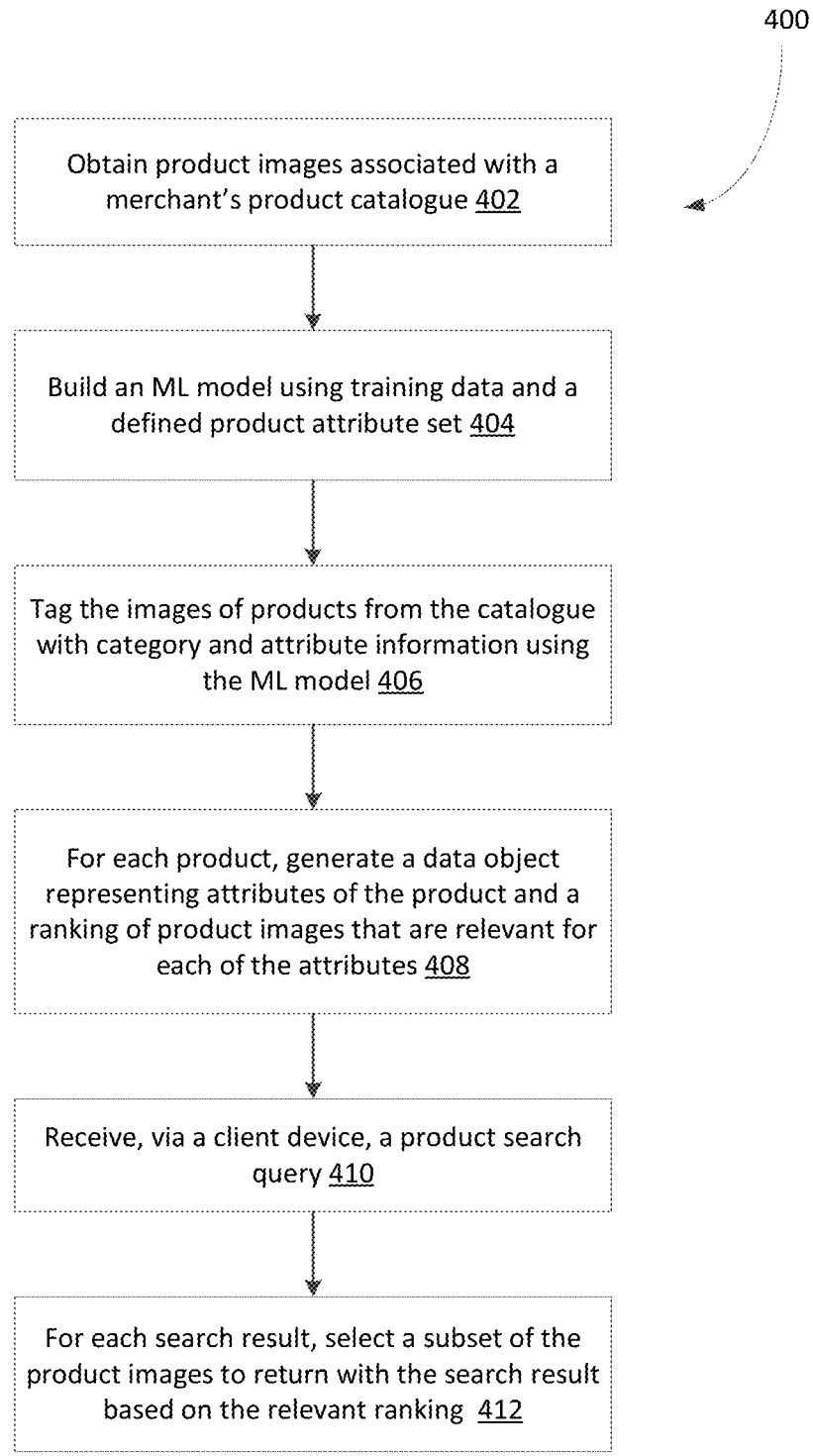
FIG. 4 shows, in flowchart form, an example method for selecting representative images for presenting as product data of a product.

Reference is now made to FIG. 4, which shows, in flowchart form, an example method 400 for selecting representative images for presenting with product data of a product. The method 400 may be performed by a computing system associated with one or more merchant facilities, such as the e-commerce platform 205 of FIG. 2. For example, a merchant facility (such as the merchant facility 220) of an e-commerce platform, or components thereof (such as the product data module 222), may perform the operations of method 400 when processing requests to provide product data for products of merchants that are supported on the e-commerce platform. In at least some embodiments, one or more of the operations of method 400 may be performed by a computing system in building a product search engine. In particular, certain operations of method 400 may be performed prior to the steps of processing product search queries and providing search results to client devices, as illustrated with reference to method 300.

In order to implement the disclosed methods for presenting product data on mobile user interfaces, product images of merchant products may be pre-processed by a trained machine learning model. A computing system that is configured for processing requests for product data may implement such a machine learning model. The computing system first obtains product images associated with a merchant's product catalogue, in operation 402. For example, the computing system may access a product database storing product data, including image data, for products of a merchant.

In operation 404, the computing system builds a machine learning model using training data and a defined product attribute set. For example, to train the model, the computing system may obtain, as inputs to the model, a predefined set of key product attributes (e.g., attributes of importance for commonly sold products) and images of products of one or more sample product catalogues. The computing system then tags the product images with tag metadata using the trained machine learning model, in operation 406. The product images may be tagged with, among others, product category and attribute data for one or more product attributes associated with the images. In particular, the product attributes may be those of the predefined key attributes that are detected in the product images by the trained machine learning model.

For each product of the catalogue, the computing system generates a data object representing attributes of the product and a ranking of product images that are relevant for each of the attributes, in operation 408. The data object may, in some embodiments, comprise a data table that indicates a correspondence between each of one or more product attributes and a respective list of relevant product images. The product images that are relevant for a product attribute can be determined based on tags associated with the product images. The ranking of the relevant product images for a product attribute may be determined using the trained machine learning model. By way of example, the trained machine learning model may assign, for each product image, a confidence score representing a degree of confidence or certainty that the product featured in the image has or is characterized by a specific product attribute. For each of the identified product attributes (e.g., key attributes), a ranking of the relevant product images may be determined based on the images' assigned confidence scores with respect to the product attribute.

Once the machine learning model has been trained on the inputs of predefined key product attributes and sample product images, the trained model may be employed for selecting relevant product images to present in connection with product search results. The computing system receives, via a client device, a product search query, in operation 410. Using the trained model, the computing system selects, for each search result of the product search, a subset of the associated product images to return with the search result based on the relevant ranking, in operation 412. As previously described, the relevant ranking may be a ranking of product images corresponding to a product attribute that is determined to be significant for the product search (i.e., the "first product attribute" in method 300).

Figure 8:
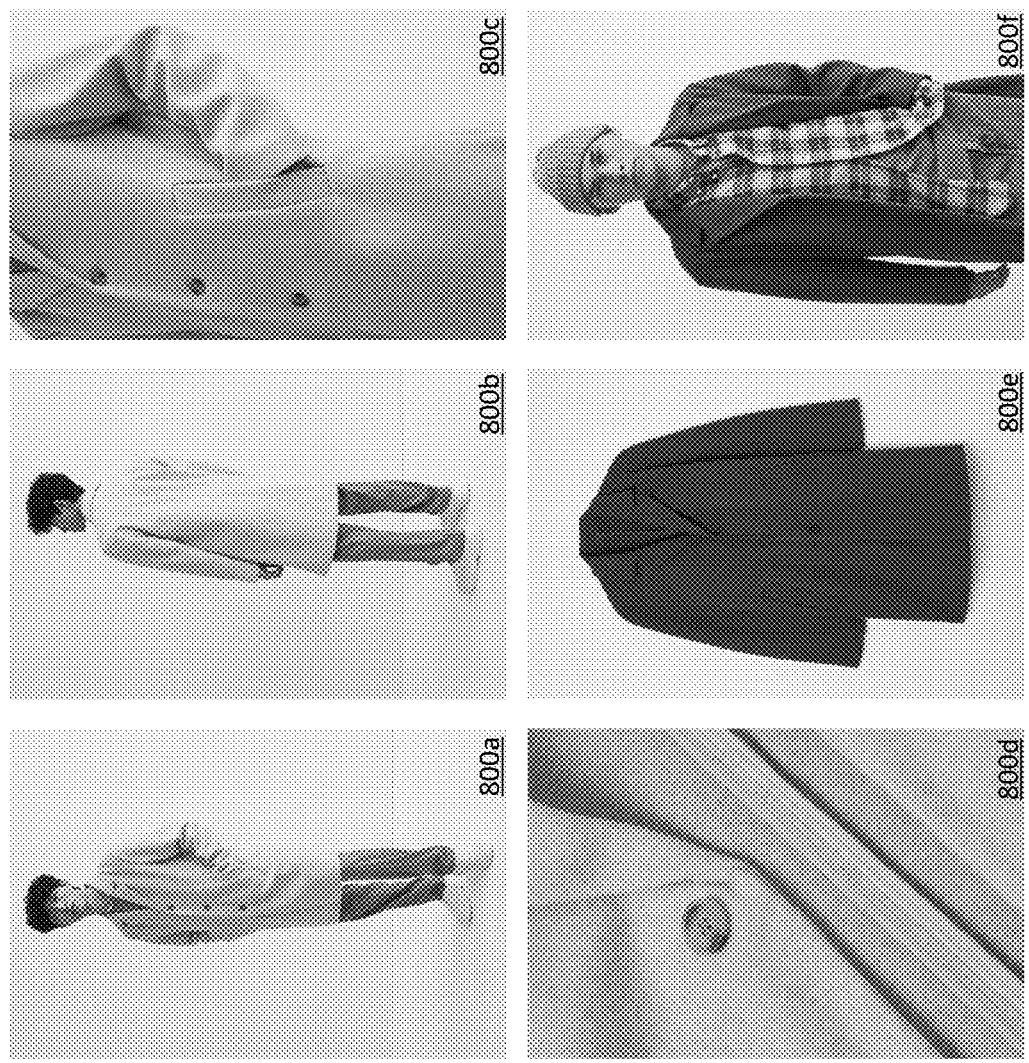
FIG. 8 shows a plurality of different images of a same product which may be uploaded by a merchant of the product.

An example embodiment of a graphical user interface for product searches will be described with reference to FIGS. 8 and 9. FIG. 8 shows a plurality of product images 800a-f that are associated with a particular product. Specifically, product images 800a-f are photographs depicting variants of the same product (i.e., a coat). The product images 800a-f show different perspectives (e.g., front, back, side) and views (e.g., close-up view) of the product. A merchant selling the product may upload the product images 800a-f to a database storing images of products in the merchant's catalogue. For example, the merchant may upload the product images 800a-f to an e-commerce platform that supports one or more of the merchant's online storefronts.

The uploaded product images 800a-f may be tagged by relevant categories and attributes by a trained machine learning model, as described with reference to method 400. In particular, a computing system associated with an e-commerce platform may associate, for each of the uploaded images, tag data identifying one or more attributes (e.g., key attributes) of depicted products using a machine learning model. Once the product images 800a-f are tagged, a data table representing a list of key attributes and images that are relevant to the attributes may be generated. Table 1 is an example of such a data table generated based on the tagged product images. Table 1 indicates, for each of a plurality of key attributes, (1) an average confidence score associated with the product images that are identified as containing the attribute, and (2) a ranking of the product images associated with the attribute, where the ranking represents a confidence level/relevancy of the images to the attribute.

TABLE 1

| Attribute | Confidence | Product Images |
| --- | --- | --- |
| Men's | 1 | [800a, 800b, 800f, 800c, 800d, 800e] |
| Long Sleeve | 0.857 | [800c, 800e, 800f, 800b, 800a] |
| Cotton Blend Texture | 0.752 | [800d, 800c] |
| Lined Sleeves | 0.82 | [800b] |
| Welt Pocket | 0.83 | [800c, 800e, 800a] |
| Marble Pattern Button | 0.91 | [800d] |

By way of example, for the attribute "welt pocket", the computing system (using the machine learning model) may identify product images 800a, 800c, and 800e as being relevant to the attribute, with the image 800c being the most relevant (i.e., highest confidence that the product depicted in the image contains a welt pocket) image, followed by product images 800e and 800a.

In at least some embodiments, each of one or more of the product images may be associated with multiple confidence scores corresponding to the different attributes. Specifically, a product image may have a respective confidence score for each attribute, and the confidence score information may be stored in association with the product images (or references thereto). For example, a data table generated based on tagged product images may indicate, for each key attribute, a ranking of the product images associated with the attribute as well as confidence scores of the product images with respect to the attribute.

Figure 9:
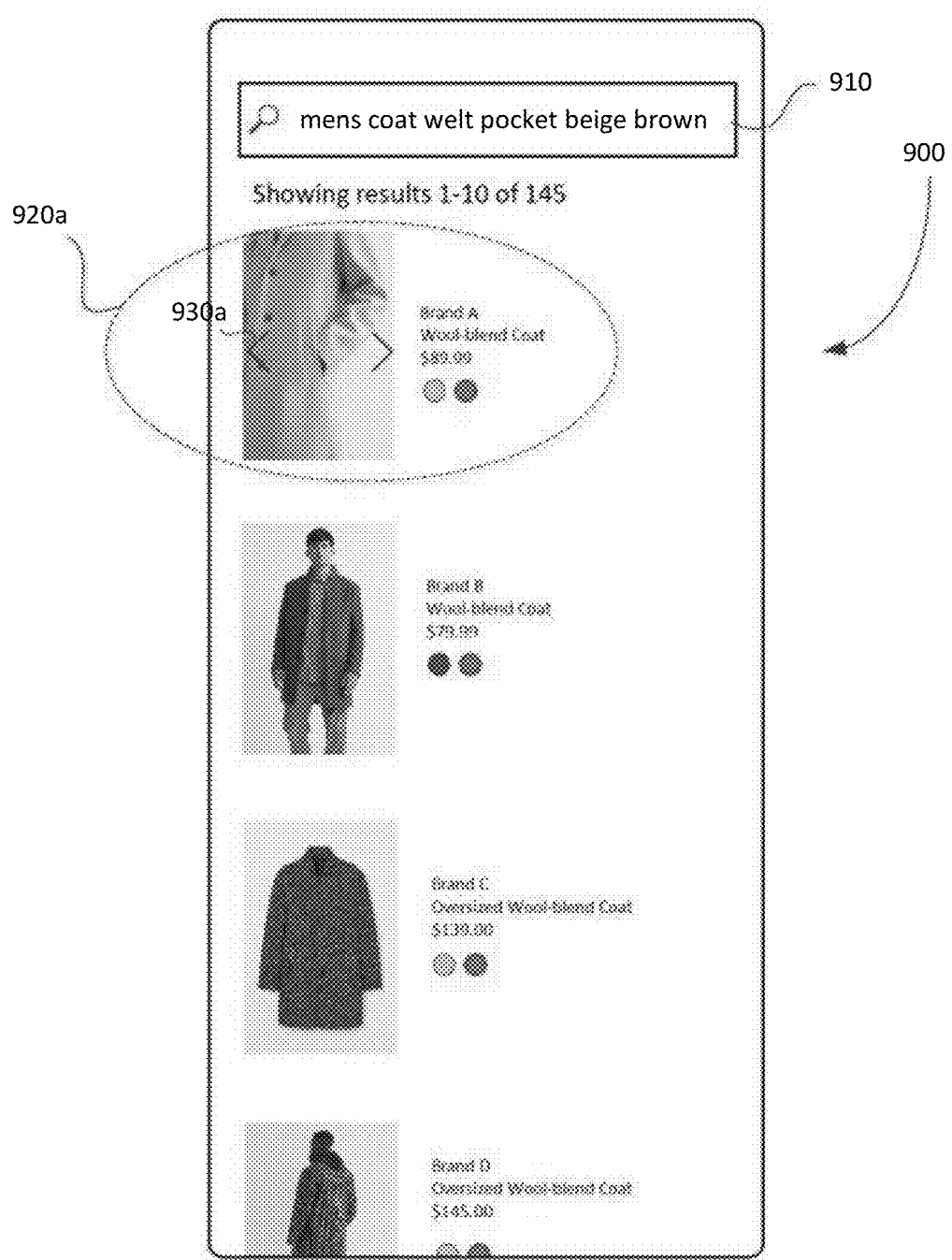
FIG. 9 shows an example graphical user interface for product search queries that selectively presents a subset of the product images shown in FIG. 8.

FIG. 9 illustrates an example graphical user interface 900 for product searches. For example, the graphical user interface 900 may be a user interface of a mobile retail application (e.g., for a merchant's online storefront). The graphical user interface may enable a product search function. In the example of FIG. 9, user input of search query terms may be entered in a search box 910 to initiate a product search such as, for example, a search of one or more merchants' product catalogues. A product search may return a plurality of product search result items, including search result item 920a. In particular, the graphical user interface 900 may be used to display a plurality of search result items responsive to processing a user-initiated product search. Each search result item may include, at least, a representative (e.g., preview) image of the product and accompanying descriptive text identifying the product name, category, price, etc. of the associated product. In some embodiments, multiple representative images may be presented as preview images for a search result item. For example, the graphical user interface 900 may include user interface elements (e.g., arrows 930a) for scrolling through a list of product preview images. The order of the preview images may correspond to a ranking of the product images based on confidence level. That is, in the original listing of the search result items, the preview images associated with each item may be presented in an order corresponding to a ranking of a select subset of the product images of the product. In the example of FIG. 9, the product image 800c of FIG. 8 which, according to Table 1 is the highest ranked product image for the attribute "welt pocket", is displayed as the initial representative image for the product search result item 920a. The ranking and selection of the representative image(s) provided as part of a search result item may be performed in accordance with one or more of the methods described herein.

Figure 5:
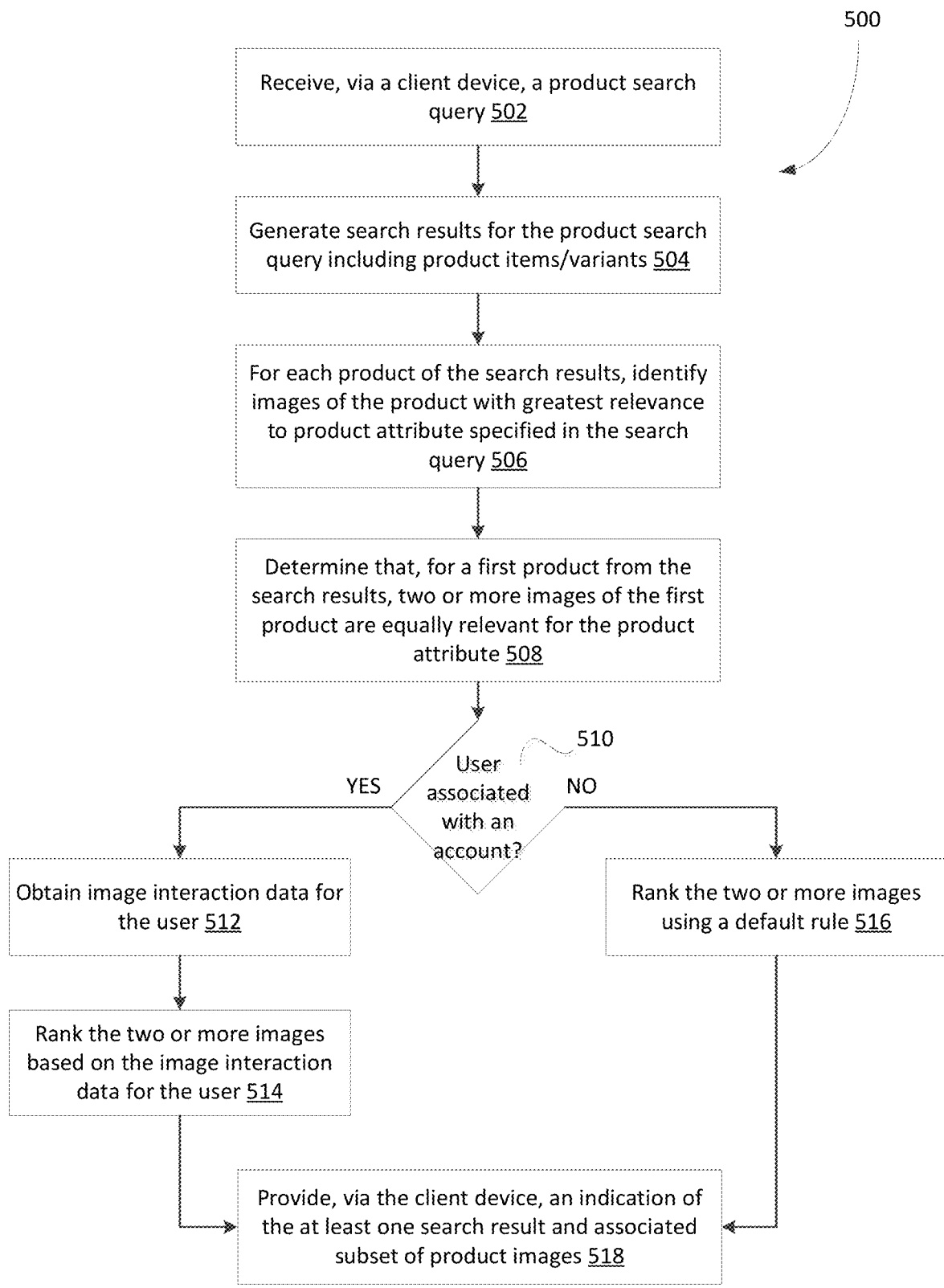
FIG. 5 shows, in flowchart form, another example method for presenting product data via a user interface on a mobile computing device.

Reference is now made to FIG. 5, which shows, in flowchart form, another example method 500 for presenting product data via a user interface on a computing device. The method 500 may be performed by a computing system associated with one or more merchant facilities, such as the e-commerce platform 205 of FIG. 2. For example, a merchant facility (such as merchant facility 220) of an e-commerce platform, or components thereof (such as the product data module 222), may perform the operations of method 500 when processing requests to provide product data for products of merchants that are supported on the e-commerce platform. The operations of method 500 may be performed in addition to, or as alternatives of, one or more of the operations of methods 300 and 400.

The determination of representative image(s) to present as part of product data for search results of a product search may depend on a multitude of factors. The methods 300 and 400 provide techniques for identifying representative images based on an attribute-confidence analysis of product images, in which product images are ranked for each product attribute, by a trained machine learning model, based on confidence levels representing degree of confidence that the featured product in the images has or is characterized by the product attribute. In at least some implementations, a computing system may account for more than just this attribute-confidence analysis when selecting representative images for product search results.

A computing system, such a system implementing an e-commerce platform or a merchant facility contained therein, may receive a product search query. The product search query may be received, for example, via a client device (e.g., using a GUI accessed on the client device), in operation 502. Responsive to receiving the product search query, the computing system generates search results for the product search including product items and/or variants matching the search query, in operation 504. In particular, the computing system may perform, or cause to be performed, queries of one or more product databases in order to identify products that match the product search query.

For each product of a search result, the computing system identifies images of the associated product with greatest relevance to product attribute(s) specified in the search query, in operation 506. In particular, a subset of product images of the product is selected. The selection of such subset of product images may proceed in accordance with any one or more of the techniques described above. Specifically, an attribute-confidence analysis of the product images may be performed in order to identify a subset of the product images that are relevant with respect to an identified (e.g., "key") product attribute.

In operation 508, the computing system determines that, for a first one of the products from the search results, two or more images of the first product are equally relevant for the product attribute. That is, two or more product images may be associated with a same level of confidence (e.g., same confidence score) with respect to a particular product attribute. For example, a trained machine learning model may rank product images for a search result based on confidence scores with respect to a product attribute, and two or more of the product images may have the same rank as a result of a statistical tie between the images in terms of their associated confidence scores. The confidence scores may, for example, be within a defined threshold margin of difference such that the difference is not statistically significant for the purpose of ranking the product images.

In such instances, the computing system may employ other factors in order to rank the images having the statistically same score. In at least some implementations, the computing system may obtain image interaction data for a user associated with the product search. Image interaction data is a type of user interface interaction data relating specifically to interactions with images. Specifically, image interaction data indicates previous interactions by a user with images associated with one or more products. For example, the image interaction data may indicate interactions with product images associated with previously viewed products, purchased products, and/or products added to a virtual shopping cart associated with the user. The image interaction data may include data indicating a user's historical interactions with images across user interfaces associated with one or more e-commerce channels (e.g., web user interface, mobile application GUI, etc.). A customer's image interaction data may indicate, for example, time spent viewing a particular image, image manipulation events (e.g., zoom, pan, rotate, etc.) associated with an image, and purchase events recorded within a certain interval after viewing a particular image, among others. Using the image interaction data, the computing system may detect commonalities between images of previously viewed or purchased products that a user has had a high level of engagement with. In particular, the computing system may identify one or more preferred image attributes based on the image interaction data. The set of preferred image attributes may form the basis for distinguishing between, and ultimately ranking, the product images that are statistically tied according to the attribute-confidence analysis.

The computing system performs a check to determine whether a user requesting the product data (i.e., a product search) is associated with a relevant user account. A user account may, for example, be an account that is created at a merchant server or with an e-commerce platform supporting the online store(s) of a merchant. If, in operation 510, the computing system determines that the user is associated with a user account, the computing system proceeds to obtain user interface interaction data for the user. In particular, the computing system obtains image interaction data for the user, in operation 512. In at least some embodiments, the computing system may first require authentication of the user to the relevant user account. That is, the computing system may obtain the user's image interaction data only upon confirming that the user has been authenticated to a user account, for example, with a merchant and/or e-commerce platform.

In operation 514, the computing system ranks the statistically tied product images based on the image interaction data for the user. In some embodiments, the computing system may identify image attributes associated with the equally ranked product images and determine whether any of said product images is associated with any of the preferred image attributes, i.e., image attributes determined to be preferred by the customer based on their image interaction data. An image that is associated with more of the preferred image attributes than the other equally ranked product image(s) may then be assigned a higher rank.

If, on the other hand, the computing system determines that the user is not associated with any relevant user account (i.e., an account with a merchant or e-commerce platform), the computing system ranks the two or more images using a default rule, in operation 516. The default rule may be a fixed tie-breaker rule for arbitrarily assigning a higher rank to one of the statistically tied product images in the ranking of product images with respect to a product attribute.

Upon ranking the two or more images that are tied according to the attribute-confidence analysis, the computing system provides, via the client device, an indication of the at least one search result and associated subset of product images, in operation 518. The subset may include, for example, a predefined number of the highest ranked product images with respect to the product attribute, where the ranking is determined based on both attribute-confidence analysis and image interaction data for a customer requesting the product search.

Figure 6:
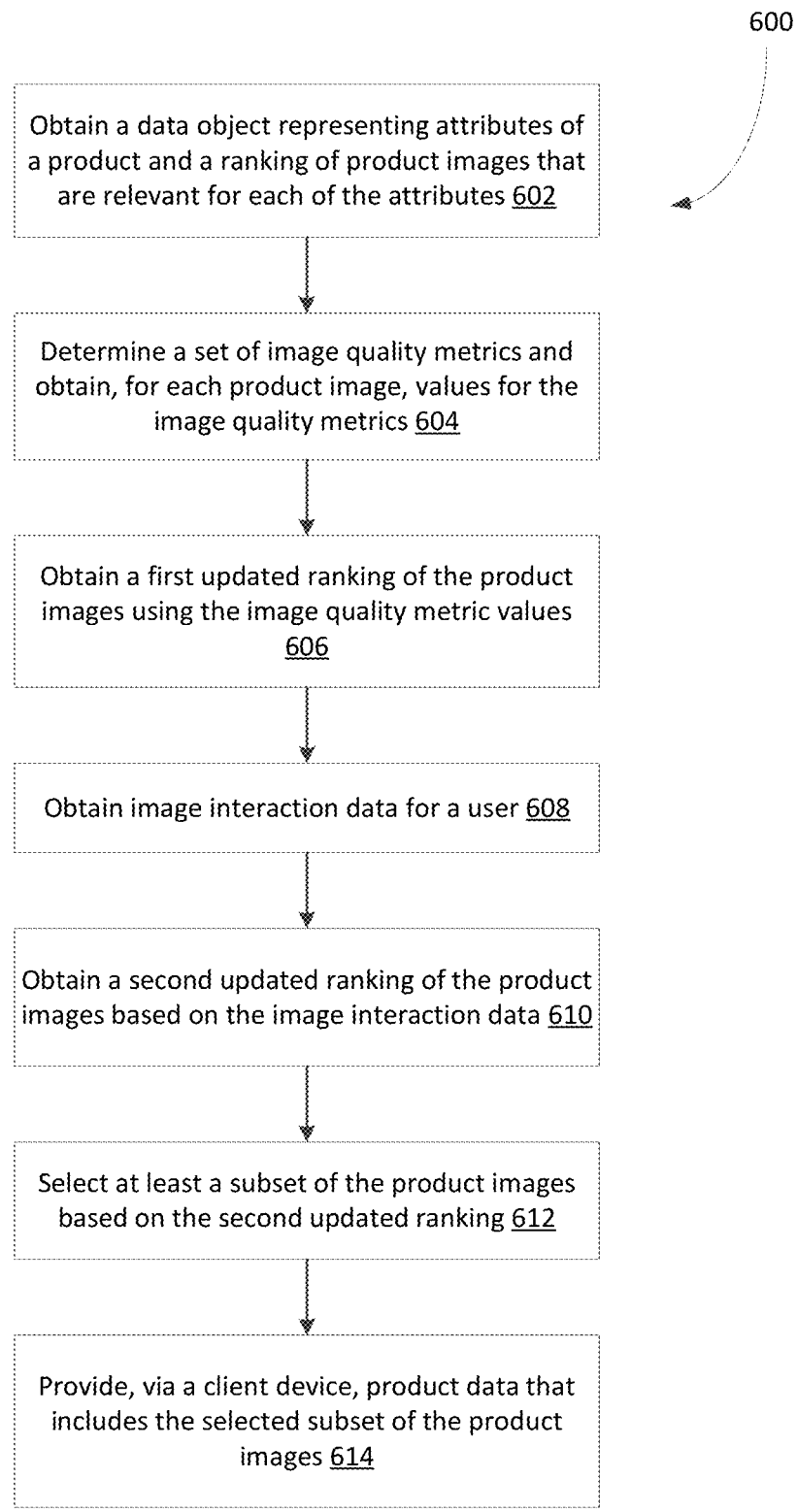
FIG. 6 shows, in flowchart form, another example method for presenting product data via a user interface on a mobile computing device.

Reference is now made to FIG. 6, which shows, in flowchart form, another example method 600 for presenting product data via a user interface on a computing device. The method 600 may be performed by a computing system associated with one or more merchant facilities, such as the e-commerce platform 205 of FIG. 2. For example, a merchant facility (such as merchant facility 220) of an e-commerce platform, or components thereof (such as the product data module 222), may perform the operations of method 600 when processing requests to provide product data for products of merchants that are supported on the e-commerce platform. The operations of method 600 may be performed in addition to, or as alternatives of, one or more of the operations of methods 300, 400 and 500.

As explained with reference to FIG. 5, additional factors may be employed in determining rankings of product images with respect to particular product attributes which, in turn, affects the selection of representative images for products associated with product data requests (e.g., product search). In some implementations, image quality metrics measuring quality of the product images may be processed when deriving product image rankings. Specifically, the values of various image quality metrics associated with the product images may be used to rank the product images. The image quality of product images may be processed using a machine learning model. For example, the output of the trained machine learning model may include, for each product image, one or more of: a score representing whether the product is in focus; a classification of the view (e.g., perspective, front, plan, etc.) of the product; color, brightness, contrast, and hue; proportion of image occupied by the product; and whether the product is shown in the context of other subjects or products.

A computing system may progressively update the ranking of product images when selecting representative image (s) for products associated with a product data request. In operation 602, the computing system obtains a data object representing attributes of a product and a ranking of product images that are relevant for each of the attributes. In particular, the data object may indicate, for each key product attribute, a correspondence between the attribute and a ranked list of the product images that feature the attribute. This initial ranking of product images may be processed in accordance with the attribute-confidence analysis technique described with reference to methods 300 to 500.

The computing system then determines a set of image quality metrics and obtains, for each product image, values for the image quality metrics, in operation 604. In operation 606, the computing system obtains a first updated ranking of the product images using the image quality metric values. That is, the computing system derives an updated ranking that factors in both an attribute-confidence analysis of the product images and image qualities of the product images.

The computing system subsequently obtains image interaction data associated with a user/customer requesting the product data, in operation 608. The image interaction data represents a particular user's historical interaction with images via one or more user interfaces of e-commerce channels. The image interaction data for the user may be obtained in a similar manner as described above with reference to method 500.

In operation 610, the computing system obtains a second updated ranking of the product images based on the image interaction data. This second updated ranking represents a product image ranking which factors in attribute-confidence analysis, image qualities of the product images, and image interaction data of the user requesting the product data.

The computing system selects at least a subset of the product images based on the second updated ranking, in operation 612. The subset may include, for example, a selection of the highest ranked product images according to the second updated ranking. The computing system then provides, via a client device, product data that includes the selected subset of the product images, in operation 614.

Figure 7:
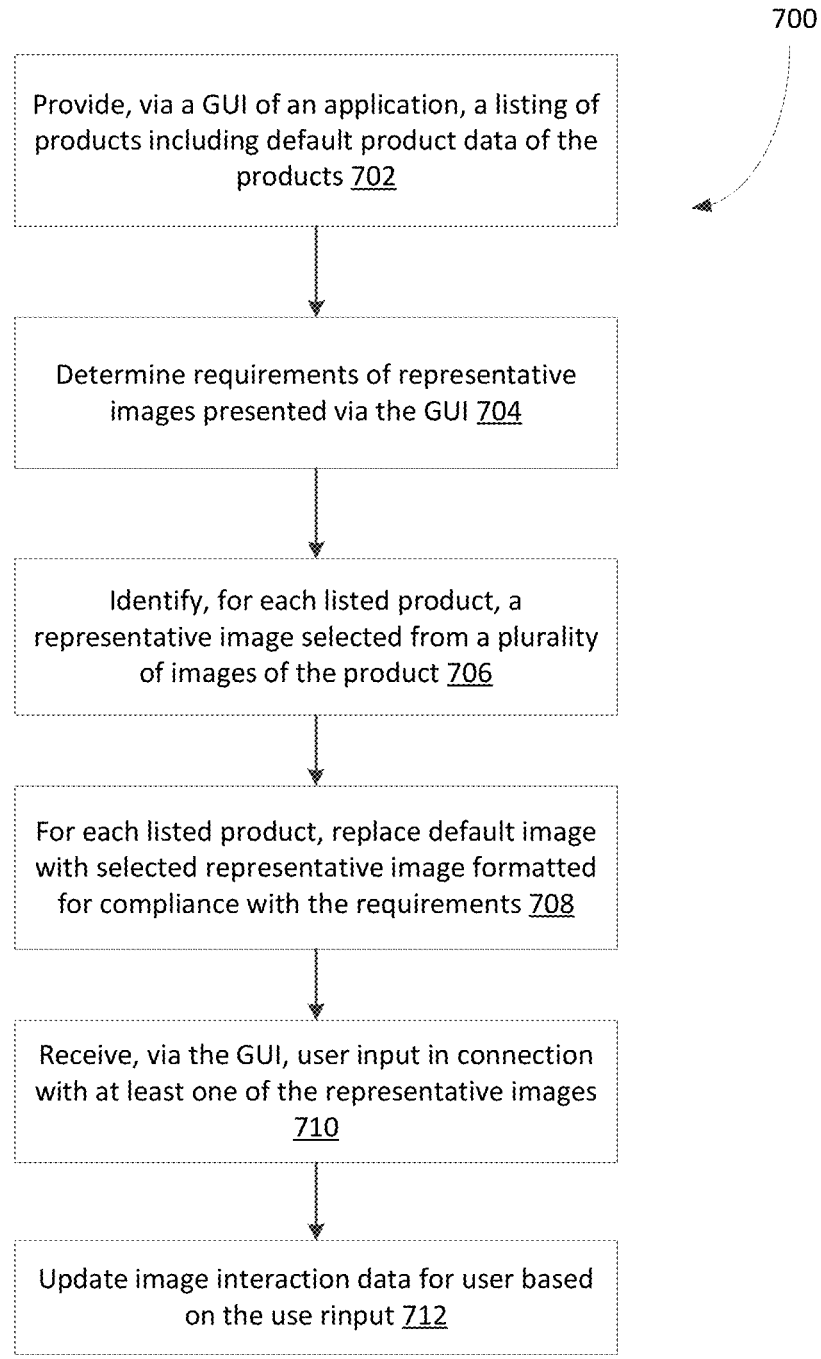
FIG. 7 shows, in flowchart form, an example method for providing a graphical user interface associated with an e-commerce channel on a mobile computing device.

Reference is now made to FIG. 7, which shows, in flowchart form, an example method 700 for managing a user interface associated with an e-commerce channel. The method 700 may be performed by a computing system associated with one or more merchant facilities, such as the e-commerce platform 205 of FIG. 2. For example, a merchant facility (such as merchant facility 220) of an e-commerce platform, or components thereof (such as the product data module 222), may perform the operations of method 700.

In operation 702, the computing system provides, via a GUI of an application, a listing of products including default product data of products associated with a product data request. In particular, the GUI may initially display a product listing in which each listed product item is presented with a default product image. The default product image may be an image that is assigned to the product item based on a default rule (e.g., a first uploaded image of the product) and not, for example, based on any of the dynamic ranking and image selection techniques described herein. For example, the default product image may be an image that is designated as the main preview image for the product in accordance with a defined default rule.

In operation 704, the computing system determines requirements of representative image presented via the GUI. The computing system then identifies, for each listed product, a representative image selected from a plurality of images of the product, in operation 706. In particular, the selection of the representative image in operation 706 proceeds according to one or more of the techniques described above for ranking and selecting product images with respect to specific product attributes (for example, queried attributes of a product search).

For each listed product, the computing system replaces a default product with the selected representative image formatted for compliance with the requirements, in operation 708. In at least some embodiments, the computing system may modify image properties of the representative image in order to properly display said image in the GUI. For example, the computing system may modify one or more of dimensions, resolution, etc. of the representative image, and the modified image may be displayed in place of the default image in association with the product item.

In operation 710, the computing system receives, via the GUI, user input in connection with at least one of the representative images. The computing system may then update image interaction data for the user based on the user input, in operation 712.

Example E-Commerce Platform

Although not required, in some embodiments, the methods disclosed herein may be performed on or in association with an e-commerce platform. An example of an e-commerce platform will now be described.

Figure 10:
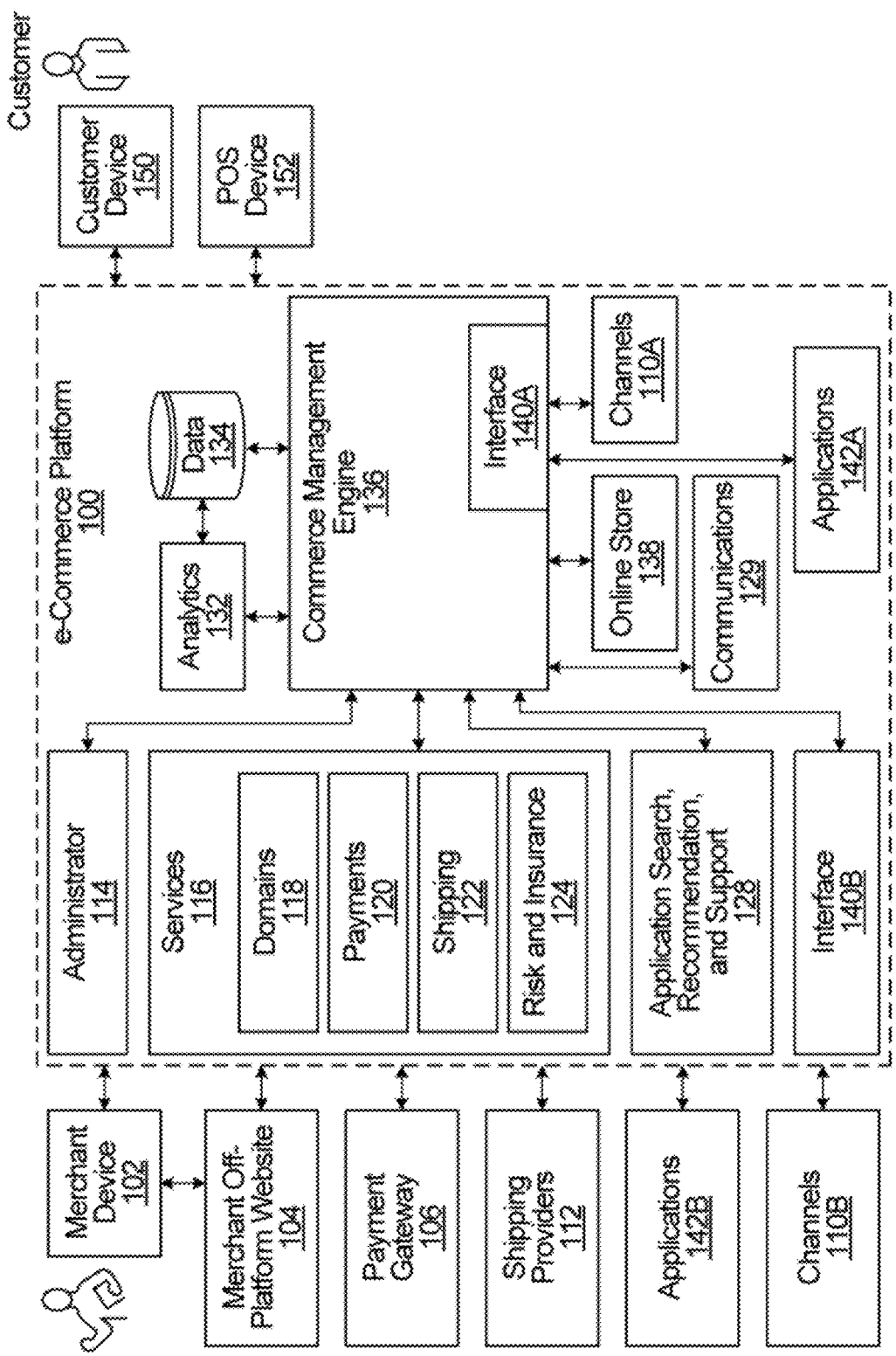
FIG. 10 is a block diagram of an e-commerce platform, in accordance with an example embodiment.

FIG. 10 illustrates an example e-commerce platform 100, according to one embodiment. The e-commerce platform 100 may be exemplary of the e-commerce platform 205 described with reference to FIG. 2. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, additionally or alternatively, be provided by one or more providers/entities.

In the example of FIG. 10, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure, the terms online store and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a virtual shopping cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product data. It may be that themes can be further customized through a theme editor, a design interface that enables users to customize their website's design with flexibility. Additionally, or alternatively, it may be that themes can, additionally or alternatively, be customized using theme—specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 11 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 11. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned virtual shopping carts, and/or other transactional information associated with business through the e-commerce platform 100. In some embodiments, the e-commerce platform 100 may store this data in a data facility 134. Referring again to FIG. 10, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their virtual shopping cart, proceeds to checkout, and pays for the content of their virtual shopping cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method comprising:
tagging images of items from a collection of items according to whether key attributes are represented in the images, the tagging including, for images of a given item:
processing each of the images of the given item using a Machine Learning (ML) model trained to provide confidence scores for key attributes each representing a degree of confidence or certainty that a given image has or is characterized by a corresponding key attribute;
searching the collection of items to identify items satisfying a search query, the searching including:
receiving, via a client device, the search query including a plurality of query terms; and
identifying, from amongst the items from the collection of items, a set of search results consisting of items matching the search query;
providing the set of search results together with selected images of the items of the set of search results, the providing including:
identifying one or more key attributes based on the plurality of query terms of the search query; and
selecting images to provide together with the items of the set of search results, the selecting including, for a given result item of the set of search results:
obtaining, for images of the given result item, the confidence scores for the identified one or more key attributes, each of the confidence scores representing the degree of confidence or certainty that a given one of the images of the given result item includes a given one of the one or more key attributes; and
selecting one of the images of the given result item based on the confidence scores; and
providing, via the client device, an indication of the set of search results and the selected images of the items of the set of search results.

2. The method of claim 1, wherein identifying the one or more key attributes comprises:
determining one or more queried attributes based on the plurality of query terms of the search query; and
identifying the one or more key attributes based on comparing the one or more queried attributes and a plurality of defined key attributes.

3. The method of claim 1, wherein, for a given result item of the set of search results, selecting the one of the images of the given result item based on the confidence scores comprises:
ranking the images of the given result item based on the confidence scores for the identified one or more key attributes; and
selecting one of the images of the given result item having a highest ranking amongst the images of the given result item.

4. The method of claim 3, wherein the ranking correlates to an ordering of the images of the given result item based on the confidence scores.

5. The method of claim 3, wherein ranking the images of the given result item comprises, for a user associated with the client device, obtaining image interaction data for the user, the image interaction data indicating previous interactions by the user with images associated with one or more items, and ranking the images of the given result item based on the confidence scores and the image interaction data for the images of the given result item.

6. The method of claim 5, wherein the items are products, and the image interaction data indicates previous interactions with images associated with one or both of previously viewed items and previously purchased items.

7. A computing system, comprising:
a processor;
a memory coupled to the processor, the memory storing computer-executable instructions that, when executed, configure the processor to:
tag images of items from a collection of items according to whether key attributes are represented in the images, the tagging including, for images of a given item, processing each of the images of the given item using a Machine Learning (ML) model trained to provide confidence scores for key attributes each representing a degree of confidence or certainty that a given image has or is characterized by a corresponding key attribute;
search the collection of items to identify items satisfying a search query, the searching including receiving, via a client device, the search query including a plurality of query terms and identifying, from amongst the items from the collection of items, a set of search results consisting of items matching the search query;
provide the set of search results together with selected images of the items of the set of search results, the providing including identifying one or more key attributes based on the plurality of query terms of the search query and selecting images to provide together with the items of the set of search results, the selecting including, for a given result item of the set of search results:
obtaining, for images of the given result item, the confidence scores for the identified one or more key attributes, each of the confidence scores representing the degree of confidence or certainty that a given one of images of the given result item includes a given one of the one or more key attributes; and
selecting one of the images of the given result item based on the confidence scores; and
provide, via the client device, an indication of the set of search results and the selected images of the items of the set of search results.

8. The computing system of claim 7, wherein identifying the one or more key attributes comprises:
   determining one or more queried attributes based on the plurality of query terms of the search query; and
   identifying the one or more key attributes based on comparing the one or more queried attributes and a plurality of defined key attributes.

9. The computing system of claim 7, wherein, for a given result item of the set of search results, selecting the one of the images of the given result item based on the confidence scores comprises:
   ranking the images of the given result item based on the confidence scores for the identified one or more key attributes; and
   selecting one of the images of the given result item having a highest ranking amongst the images of the given result item.

10. The computing system of claim 7, wherein the ranking correlates to an ordering of the images of the given result item based on the confidence scores.

11. The computing system of claim 7, wherein ranking the images of the given item comprises, for a user associated with the client device, obtaining image interaction data for the user, the image interaction data indicating previous interactions by the user with images associated with one or more items, and ranking the images of the given result item based on the confidence scores and the image interaction data for the images of the given result item.

12. The computing system of claim 11, wherein the items are products, and the image interaction data indicates previous interactions with images associated with one or both of previously viewed items and previously purchased items.

13. A non-transitory, computer-readable medium storing computer-executable instructions that, when executed by a processor, are to cause the processor to:
   tag images of items from a collection of items according to whether key attributes are represented in the images, the tagging including, for images of a given item, processing each of the images of the given item using a Machine Learning (ML) model trained to provide confidence scores for key attributes each representing a degree of confidence or certainty that a given image has or is characterized by a corresponding key attribute;
   search the collection of items to identify items satisfying a search query, the searching including receiving, via a client device, the search query including a plurality of query terms and identifying, from amongst the items from the collection of items, a set of search results consisting of items matching the search query;
   provide the set of search results together with selected images of the items of the set of search results, the providing including identifying one or more key attributes based on the plurality of query terms of the search query and selecting images to provide together with the items of the set of search results, the selecting including, for a given result item of the set of search results:
      obtaining, for images of the given result item, the confidence scores for the identified one or more key attributes, each of the confidence scores representing the degree of confidence or certainty that a given one of images of the given result item includes a given one of the one or more key attributes; and
      selecting one of the images of the given result item based on the confidence scores; and
   provide, via the client device, an indication of the set of search results and the selected images of the items of the set of search results.

14. The computer-readable medium of claim 13, wherein identifying the one or more key attributes comprises:
   determining one or more queried attributes based on the plurality of query terms of the search query; and
   identifying the one or more key attributes based on comparing the one or more queried attributes and a plurality of defined key attributes.

* * * * *